United States Patent
Parks et al.

(10) Patent No.: US 9,658,314 B2
(45) Date of Patent: May 23, 2017

(54) SYSTEM AND METHOD FOR GEO-LOCATING AND DETECTING SOURCE OF ELECTROMAGNETIC EMISSIONS

(75) Inventors: Brandon Scott Parks, South Park, PA (US); Walter J. Keller, III, Bridgeville, PA (US); Jennting Timothy Hsu, Bethel Park, PA (US)

(73) Assignee: Nokomis, Inc., Charleroi, PA (US)

( * ) Notice: Subject to any disclaimer, the term of this patent is extended or adjusted under 35 U.S.C. 154(b) by 941 days.

(21) Appl. No.: 13/410,586

(22) Filed: Mar. 2, 2012

(65) Prior Publication Data

US 2013/0229310 A1 Sep. 5, 2013

(51) Int. Cl.
*G01S 3/02* (2006.01)
*G01S 5/04* (2006.01)
G01S 19/24 (2010.01)
G01S 5/02 (2010.01)

(52) U.S. Cl.
CPC .............. *G01S 5/04* (2013.01); *G01S 5/0284* (2013.01); *G01S 5/0221* (2013.01); *G01S 5/0278* (2013.01); *G01S 5/0294* (2013.01); *G01S 19/24* (2013.01)

(58) Field of Classification Search
CPC ... G01S 3/043; G01S 3/06; G01S 3/14; G01S 3/46; G01S 3/48; G01S 5/04; G01S 5/0045; G01S 5/0063; G01S 5/009; G01S 19/21; G01S 19/22; G01S 19/24; G01S 5/0221; G01S 5/0278; G01S 5/0284; G01S 5/0294

USPC .............. 342/354, 357.59, 357.61, 368, 417, 342/422–434, 436, 445, 450, 465
See application file for complete search history.

(56) References Cited

U.S. PATENT DOCUMENTS

| | | |
|---|---|---|
| 5,218,294 A | 6/1993 | Soiferman |
| 5,227,800 A | 7/1993 | Huguenin et al. |
| 5,302,830 A | 4/1994 | Shivanandan |
| 5,424,633 A | 6/1995 | Soiferman |
| 5,517,110 A | 5/1996 | Soiferman |
| 5,668,342 A | 9/1997 | Discher |
| 5,714,888 A | 2/1998 | Naujoks |
| 5,859,613 A * | 1/1999 | Otto .......................... G01S 5/06 342/450 |
| 6,049,301 A | 4/2000 | Weagant |
| 6,057,765 A | 5/2000 | Jones et al. |
| 6,163,259 A | 12/2000 | Barsumian et al. |
| 6,496,703 B1 | 12/2002 | da Silva |
| 6,720,905 B2 | 4/2004 | Levitan et al. |
| 6,759,863 B2 | 7/2004 | Moore |
| 6,765,527 B2 | 7/2004 | Jablonski et al. |
| 6,785,553 B2 * | 8/2004 | Chang ....................... G01S 5/14 342/357.48 |
| 6,825,456 B2 | 11/2004 | Chadwick et al. |

(Continued)

*Primary Examiner* — Chuong P Nguyen
(74) *Attorney, Agent, or Firm* — James Ray & Assoc.

(57) ABSTRACT

A system for identifying a real-world geographic location of an emission source emitting electromagnetic energy includes a platform configured for movement and an apparatus disposed on the platform and configured to collect and process, in a passive manner and during movement of the platform, at least a pair of successive samples of the electromagnetic energy emission and define angular and spatial coordinates of the emission source. The apparatus includes at least a pair of antennas, a receiver coupled to antennas and a processor executing a predetermined logic.

36 Claims, 10 Drawing Sheets

(56) References Cited

U.S. PATENT DOCUMENTS

| | | |
|---|---|---|
| 6,897,777 B2 | 5/2005 | Holmes et al. |
| 6,927,579 B2 | 8/2005 | Blades |
| 6,985,771 B2 | 1/2006 | Fischell et al. |
| 7,130,624 B1 | 10/2006 | Jackson et al. |
| 7,138,936 B2 | 11/2006 | Duff et al. |
| 7,188,037 B2 | 3/2007 | Hidehira |
| 7,233,285 B2 * | 6/2007 | Struckman .................... 342/451 |
| 7,268,728 B1 * | 9/2007 | Struckman ................ G01S 5/04 342/424 |
| 7,391,356 B2 | 6/2008 | Brumley et al. |
| 7,454,202 B2 * | 11/2008 | de La Chapelle ............ 455/427 |
| 7,512,511 B1 | 3/2009 | Schultz et al. |
| 7,515,094 B2 | 4/2009 | Keller, III |
| 7,609,199 B2 | 10/2009 | Nishijima et al. |
| 7,639,178 B1 | 12/2009 | Mulbrook et al. |
| 7,683,830 B2 * | 3/2010 | Montgomery et al. .. 342/357.29 |
| 7,688,264 B2 * | 3/2010 | Chun ........................... 342/450 |
| 7,777,671 B2 | 8/2010 | Schnitzer et al. |
| 7,777,672 B2 | 8/2010 | Schnitzer et al. |
| 7,778,367 B1 * | 8/2010 | Stockmaster ......... G01S 5/0215 375/240.19 |
| 7,844,341 B2 | 11/2010 | Von Arx et al. |
| 8,063,813 B1 | 11/2011 | Keller |
| 8,294,616 B1 * | 10/2012 | Ormesher ............... G01S 5/021 342/449 |
| 8,548,649 B2 * | 10/2013 | Guyette ............... A01B 79/005 111/170 |
| 8,878,725 B2 * | 11/2014 | Lu ................................ 342/450 |
| 2006/0114157 A1 * | 6/2006 | Kolanek .................. G01S 3/46 342/424 |
| 2007/0069949 A1 * | 3/2007 | Ferreol et al. ................ 342/417 |
| 2007/0120738 A1 * | 5/2007 | Stroud ..................... G01S 5/06 342/387 |
| 2007/0279071 A1 | 12/2007 | Orton |
| 2008/0103555 A1 | 5/2008 | Dicks et al. |
| 2009/0154589 A1 * | 6/2009 | Monnerie ........... H04L 27/0008 375/269 |
| 2010/0123453 A1 | 5/2010 | Pauly et al. |
| 2010/0125438 A1 | 5/2010 | Audet |
| 2011/0095934 A1 * | 4/2011 | Freeman ............ G01R 29/0892 342/13 |
| 2011/0320170 A1 | 12/2011 | Pathak et al. |
| 2012/0007982 A1 * | 1/2012 | Giuffrida et al. ............. 348/144 |
| 2012/0154213 A1 * | 6/2012 | Bull ..................... G01S 5/0215 342/357.25 |
| 2012/0179812 A1 | 7/2012 | Keller, III |
| 2012/0223403 A1 | 9/2012 | Keller, III et al. |
| 2012/0226463 A1 | 9/2012 | Keller, III et al. |
| 2014/0043184 A1 * | 2/2014 | Malaga ................ H04B 7/0817 342/33 |
| 2014/0278214 A1 * | 9/2014 | Broad et al. ................. 702/150 |

* cited by examiner

SYSTEM AND METHOD FOR GEO-LOCATING AND DETECTING SOURCE OF ELECTROMAGNETIC EMISSIONS

STATEMENT REGARDING FEDERALLY SPONSORED RESEARCH AND DEVELOPMENT

This invention was made with government support under Small Business Innovative Research (SBIR) Contract FA8650-08-C-1402awarded by the United States Air Force. The government has certain rights in the invention.

CROSS REFERENCE TO RELATED APPLICATIONS

N/A

FIELD OF THE INVENTION

The present invention relates, in general, to geo-location of sources of electromagnetic energy emissions, and, more particularly, this invention relates to geo-location of electronics and electronic devices and, yet more particularly, the instant invention relates to geo-location of electronics and electronic devices through collection and processing of unintended electromagnetic radiation given off by the electronics and electronic devices.

REFERENCE TO SEQUENCE LISTING, A TABLE, OR A COMPUTER PROGRAM LISTING COMPACT DISC APPENDIX

N/A

BACKGROUND OF THE INVENTION

As is generally known, ability to geo-locate and detect electronic and electrical devices is of critical importance in many applications, especially for military and law enforcement.

As is further generally well known, any electronic device necessarily emits electro-magnetic radiation unintentionally. Although weak by communications standards, these radiated signals are unique, consistent and specific to a given device.

Although, previous efforts by the assignee of the instant invention were directed to collecting and measuring emitted electro-magnetic radiation so as to detect such devices, there is a further need to provide improved accuracy of geo-locating devices, particularly emitting weak radiated signals.

SUMMARY OF THE INVENTION

The invention provides a system for identifying a real-world geographic location of an emission source emitting electromagnetic energy. The system includes a platform configured for movement and an apparatus disposed on the platform and configured to collect and process, in a passive manner and during movement of the platform, at least a pair of successive samples of the electromagnetic energy emission and define angular and spatial coordinates of the emission source.

The apparatus includes a first antenna mounted on or within the platform and configured to collect a plurality of first samples of the electromagnetic energy emission and a second antenna positioned in a spaced apart relationship with the first antenna, the second antenna configured to collect a plurality of second samples of the electromagnetic energy emission. There is also a receiver means mounted on or within the platform and operatively coupled to each of the first and second antennas. A processing means is operatively coupled to the receiver means, the processing means operable to process, during movement of the platform, the at least two pair of emission signature samples of the electromagnetic energy emission in accordance with a predetermined logic, the predetermined logic defining the angular and spatial coordinates of the emission source, wherein one sample in each pair is collected at the first antenna and wherein other sample in the each pair is collected at the second antenna.

The instant invention also provides a method of geo-locating an emission source. The method includes the step of providing an apparatus including a platform configured for movement, at least a pair of antennas positioned in a spaced apart relationship with each other, each of the at least pair of antennas configured to collect the electromagnetic energy emission, wherein at least one of the at least pair of antennas is mounted on or within the platform, a receiver means mounted on or within the platform and operatively coupled to the each of the at least pair of antennas, and a processing means operatively coupled to the receiver means. Then, moving the apparatus toward to or away from the emission source. Next, collecting, with each of the at least pair of antennas, at least a pair of successive samples of electromagnetic energy emitted by the emission source. Receiving, at the receiver, the at least pair of successive samples. Finally, defining, with the processing means in accordance to a predetermined logic, angular and spatial coordinates of the emission source.

Objects of the Invention

It is, therefore, one of the primary objects of the present invention to provide a system and method for geo-locating a source of electromagnetic emissions.

Another object of the present invention is to provide a system for geo-locating a source of electromagnetic energy emissions that includes a pair of antennas mounted on a moving platform.

A further object of the present invention is to provide a system for geo-locating a source of electromagnetic energy emissions that includes a pair of antennas mounted on a moving platform and means for identifying relative location of the platform.

Yet a further object of the present invention is to provide system for geo-locating a source of electromagnetic energy emissions that includes a moving platform, at least a pair of antennas, a receiver and means for processing collected electromagnetic energy emissions.

An additional object of the present invention is to provide a method utilizing the afore-described system for geo-locating a source of electromagnetic energy emissions.

Another object of the present invention is to provide a method for geo-locating a source of electromagnetic energy emissions that includes the step of simultaneously processing electromagnetic energy emission collected at each antenna.

A further object of the present invention is to provide a method for geo-locating a source of electromagnetic energy emissions that includes the step of extracting phases from electromagnetic energy emission collected at each antenna.

A further object of the present invention is to provide a method for geo-locating a source of electromagnetic energy emissions that includes the step of extracting phases from electromagnetic energy emission collected at each antenna and determining differences between extracted phases from each antenna.

Yet a further object of the present invention is to provide a method for geo-locating a source of electromagnetic energy emissions that includes the step of filtering relative position of emission energy collection device.

Still a further object of the present invention is to provide a method for geo-locating a source of electromagnetic energy emissions that includes the step of determining direction to source of electromagnetic energy emissions;

Another object of the present invention is to provide a method for geo-locating a source of electromagnetic energy emissions that includes the step of employing statistical techniques in determining angular and spatial coordinates of the source of electromagnetic energy emissions.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE VARIOUS EMBODIMENTS OF THE INVENTION

Figure 1:
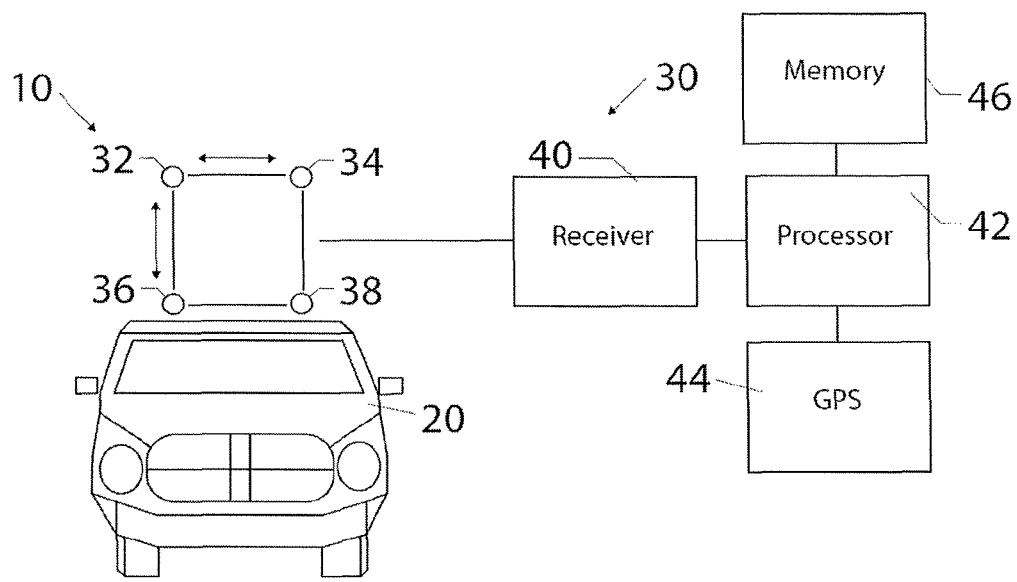
FIG. 1 is a block diagram of the system of the instant invention for geo-locating sources of electromagnetic energy emissions.

Prior to proceeding to the more detailed description of the present invention, it should be noted that, for the sake of clarity and understanding, identical components which have identical functions have been identified with identical reference numerals throughout the several views illustrated in the drawing figures.

The present invention describes a system, generally designated as 10, and method for identifying a real-world geographic location of an emission source (or target) 2 emitting electromagnetic energy 4. Preferably, the emission source 2 is a stationary emission source. The electromagnetic emission is preferably of a Radio Frequency (RF) type and is one of intentional or unintentional, although other types of electromagnetic emission are also contemplated in the instant invention.

Now in reference to FIGS. 1-18, the system 10 includes a platform 20 configured for movement. Such platform 20 may be provided as a vehicle having motive power, as shown in FIG. 1, or as a device that can be towed by vehicle having motive power. It is to be understood that definition of vehicle applies to ground-based vehicles, airborne vehicles and marine vessels.

The system 10 also provides an apparatus, generally designated as 30, that is configured to define, in a passive manner and during movement of the platform 20, angular and spatial coordinates of the target 2 based on at least a pair of successive samples or measurements of the electromagnetic energy emission.

Figure 2:
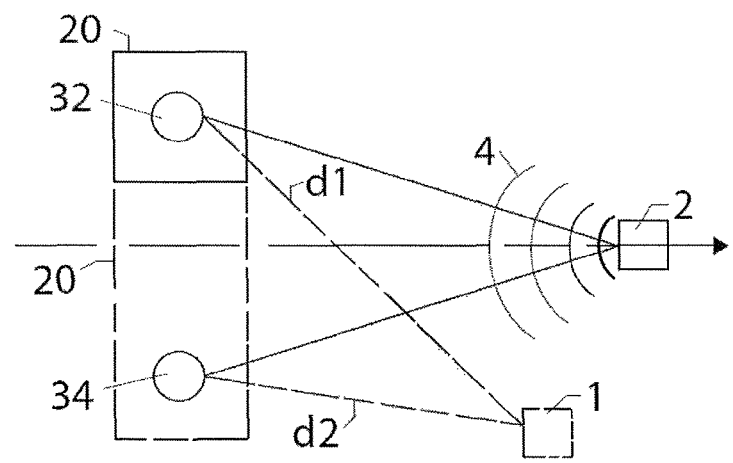
FIG. 2 is a schematic representation of antenna alignment employed in the system of FIG. 1.

The apparatus 30 includes a first antenna 32 and a second antenna 34 positioned in a spaced apart relationship with the first antenna 32, as best shown in FIG. 2. Each of the first and second antennas, 32 and 34 respectively, is configured to collect the electromagnetic energy emission independently from each other. At least one antenna, referenced with numeral 32, is mounted on or within the platform 20. The other antenna 34 may be provided as a stationary antenna or may be even mounted on a separate platform 20'. Each of the first and second antennas, 32 and 34 respectively, may be an antenna array and, more particularly, an electronically steered antenna array. Preferably, both first and second antennas, 32 and 34 respectively, are mounted, in an adjustable manner, on the same platform 20.

There is also a receiver means 36 mounted on or within the platform 20 and operatively coupled to the each of the first and second antennas, 32 and 34 respectively. The apparatus 30 additionally includes a processing means 42 operatively coupled to the receiver means 40. The processing means 42 is operable to process, during movement of the platform 20, at least pair of emission signature samples of the electromagnetic energy emission from each of the at least pair of antennas 32, 34 in accordance with a predetermined logic, the predetermined logic defining angular and spatial coordinates of the target 2.

For the reasons to be explained later, the apparatus 30 also includes means 44 for determining position of the platform 20 prior to movement and, if required, during movement. Such means 44 is preferably a Global Positioning System (GPS) device but may also be a gyro type device and any other device or method for determining position.

Apparatus 30 further may include an optional data storage means or memory 46 so as to store the results of the geo-location effort and/or signature of the electromagnetic emission expected from the target 2.

The apparatus 30 is configured for self calibration by way interoperability of the hardware and software residing in the processor 42.

As it will be shown below, the angular and spatial coordinates determine distance from the platform 20 to the target 2. Furthermore, angular and spatial coordinates determine altitude of the target 2 relative to sea level.

The angular and spatial coordinates are also used to determine approach or departure of the platform 20 relative to the target 2 and, more particularly, are used to determine angle of arrival of the platform 20 to the target 2. The instant invention takes advantage of the fact that when target 2 is offset from the direction of movement of the platform 20, the distances d1 and d2 are differ from each other, as best shown in FIG. 2. Subsequently, the amount of time that emission signal will travel to each antenna 32, 34 is also different. Accordingly, direction finding of the target 2 is performed based on the phase difference between two signals acquired by two receiving antennas 32 and 34 and processed in a substantially simultaneous manner.

Figure 3:
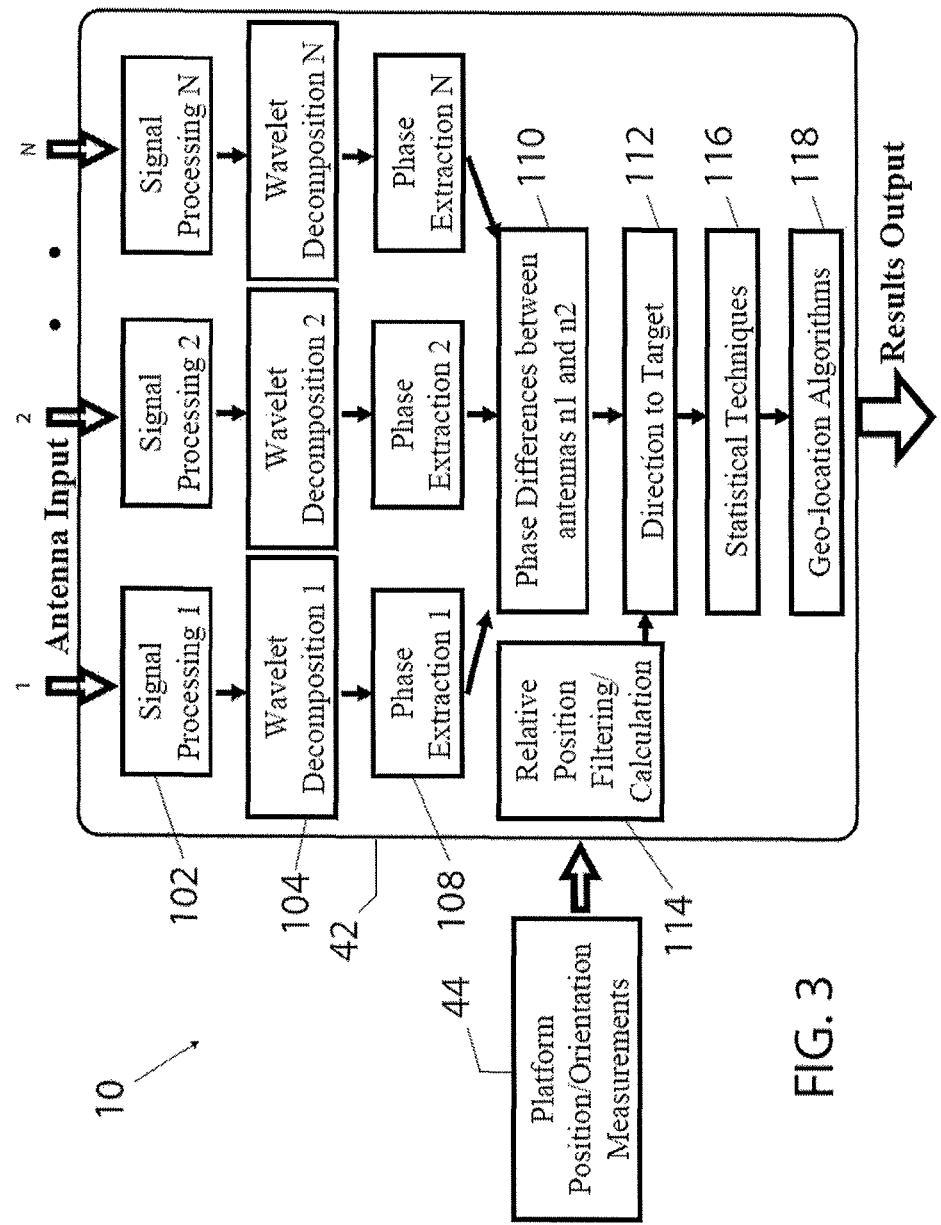
FIG. 3 is a flow chart of the method for geo-locating sources of electromagnetic energy emissions using the system of FIG. 1.
Figure 4:
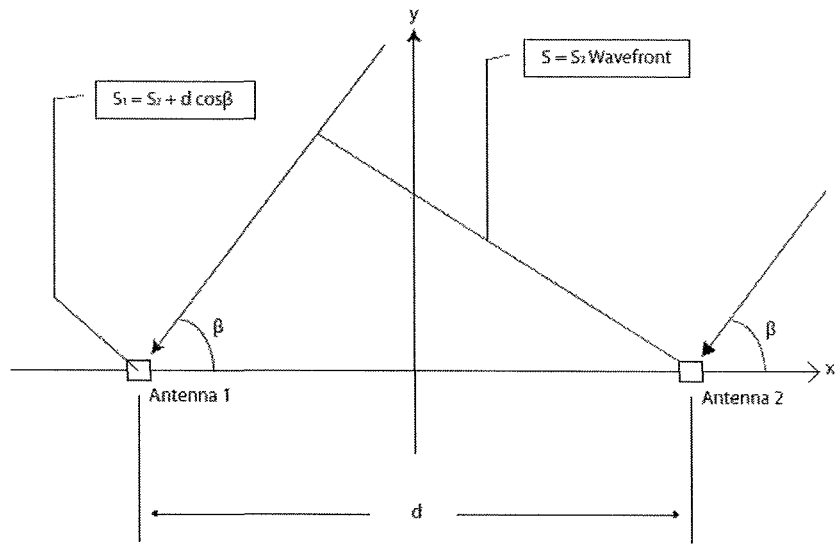
FIG. 4 illustrates lane Wave Arrival at Two Antennas with Phase difference being a result of difference in path length.
Figure 8:
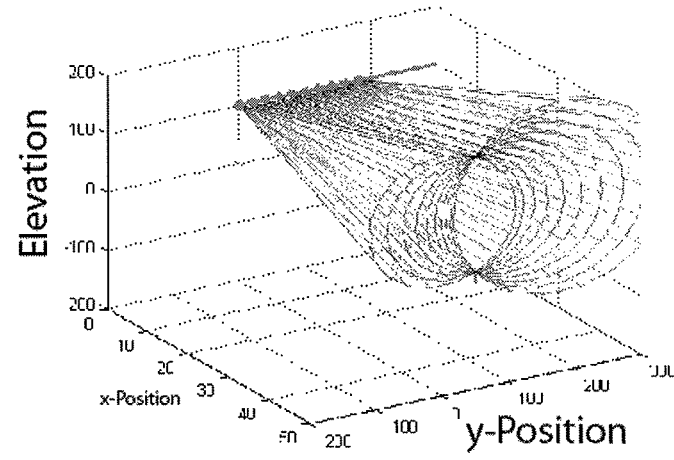
FIG. 8 illustrates Geo-location Results for a Simulated Platform Trajectory.
Figure 7:
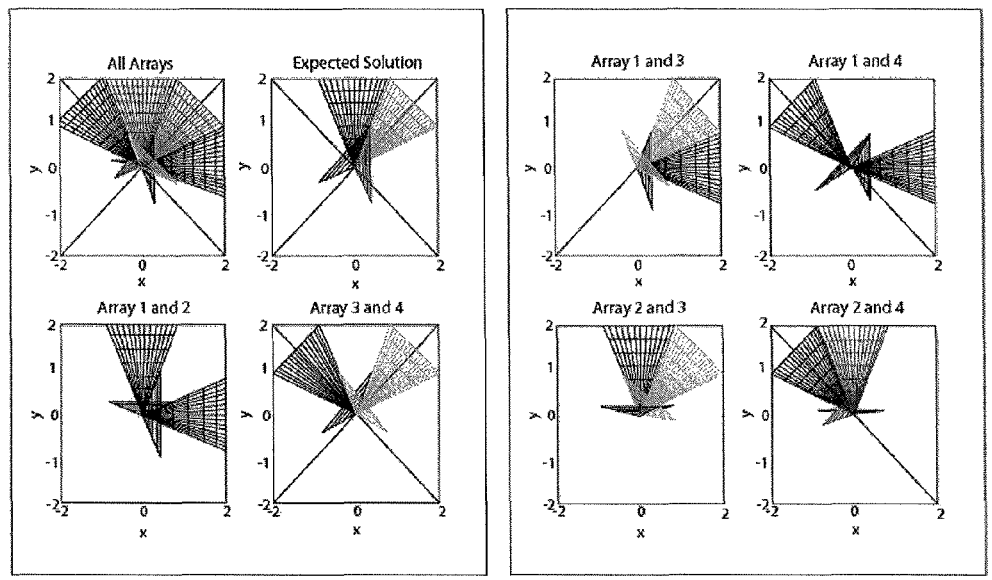
FIG. 7 illustrates solutions and intersections of solutions with array spacing of about 1.5λ.

The method logic of geo-locating the target 2 is shown in FIG. 3. The invention stipulates that after the emission signal is collected independently from each antenna 32, 34 and received at the receiver 40, proper processing of the electromagnetic emission signature of the target 2 at step 102 through wavelet decomposition, at step 104, independently but substantially simultaneously for each antenna 32, 34, provides accurate phase information. The phase information for each antenna 32, 34 is then extracted in step 108 and the phase differences are determined in step 110 by comparing extractions with each other. The phase differences are used to calculate the direction of arrival (DoA) in step 112. An interferometry technique is used to extract the DoA from the emission signal received by two or more antennas 32, 34. The DoA calculated using two antennas 32 and 34 provides an angle with respect to the axis along which the two antennas 32, 34 lie, as best shown in FIGS. 2 and 4. This angle can be rotated around the axis to form a cone on which the target 2 lies, as best shown in FIGS. 7-8. The physical characteristics of the first and second antennas, 32 and 34 respectively, such as the aperture, limit the location the target 2 to a section of the cone. Relative position of the moving platform 20 is filtered at step 114 for use in calculating DoA in step 112. Statistical techniques are used in step 116 to obtain the most closest estimates of the position of the target 2 and uncertainty associated therewith. Finally, geo-locating algorithms are employed in step 118 to geo-locate of the target 2. FIG. 8 graphically illustrates the results of measurements made at multiple points in the simulated path of the platform 20. The results may be stored locally within the system 10 or communicated to a remote location (not shown) by way of a wired or wireless connection (not shown).

In further reference to FIGS. 7-8, in order to locate the target 2 at a single angle from the plane of the antenna array defines by antennas 32 and 34, additional antenna elements may be required. By correlating the reconstructed signal from each pair of antenna elements within the antenna array, the direction of the target 2 is limited by the intersection of the calculated cones. Three antenna elements will provide sufficient information if they are not in a linear arrangement. It has been found that a greater number of antennas 32, 34 improve the accuracy of real-world position of the target 2.

Preferably, the system 10 employs four antennas 32, 34, 36 and 38 that are disposed in a square pattern and that were found to provide sufficient accuracy of geo-locating the target 2 without burdening processing capabilities of presently used processing means 42.

When the DoA information from one pair of antennas, for examples antennas 32 and 34, is combined with the information from the second pair of antennas 36 and 38, the intersection of the DoA cones provides a bearing ray pointing toward the target location. A single evaluation thus provides bearing information for a target location but does not provide any range. In addition, aliases and other ambiguities contribute additional solutions and a single DoA may not always be determined from a single data collection look. For this reason, the DoA information from the two pairs of antennas may not always be reduced to a single bearing. In this case, multiple evaluations are used to select the true bearing from the false aliases.

In order to geo-locate the target 2, the range at which the target 2 lies must also be determined. There are several methods to determine the location of the target 2. The main focus of this invention includes a triangulation technique, which relies on taking multiple measurements from the same platform 20 at at least two different locations but can also include taking measurements from separate platforms 20, 20' provided in a networked environment. After the platform 20 moves a set distance (or a set time passes), another measurement and processing of the emission signature is implemented and provides bearing information. The intersection of these two bearing beams provides the target location.

It has also been found that hardware configuration using parallel processing and shared Local Oscillators (LO) and Digital Signal Processing (DSP) algorithms yields the ability to produce phase coherent data from multiple antennas for the purpose of geo-locating detected targets 2. Particularly, phase coherent data is necessary for extracting the phase difference between elements in an antenna array. However, phase information is affected by factors such as imperfect propagation length in wires which cause measurements to contain additional phase offset which appears as an error in the phase information.

Figure 5:
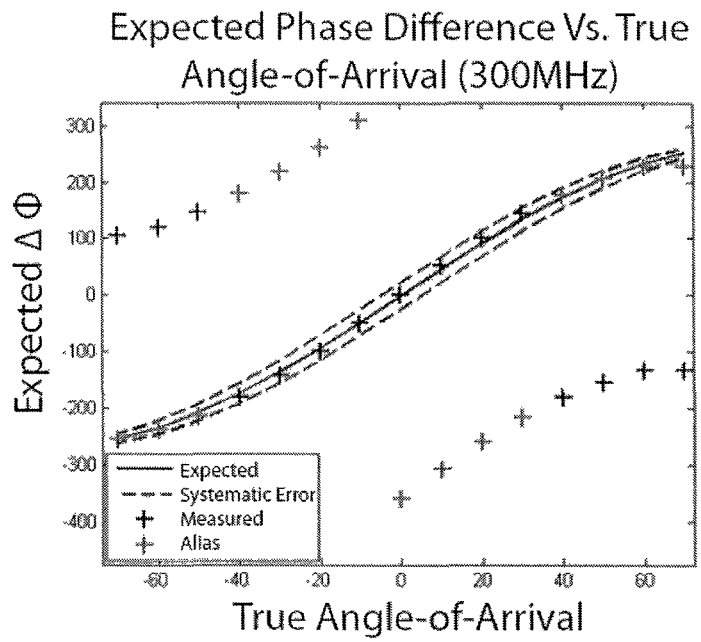
FIG. 5 illustrates Measured Phase Difference between measured signals for two-element array and showing measured results versus expected results.

When rotating the antenna array, the geo-location algorithms can be tested by measuring variable phase information for a stationary target 2. FIG. 5 displays the raw calculated phase difference for two distinct frequencies as a function of the true angle of arrival determined by the orientation of the antenna array with respect to the target 2.

Figure 6:
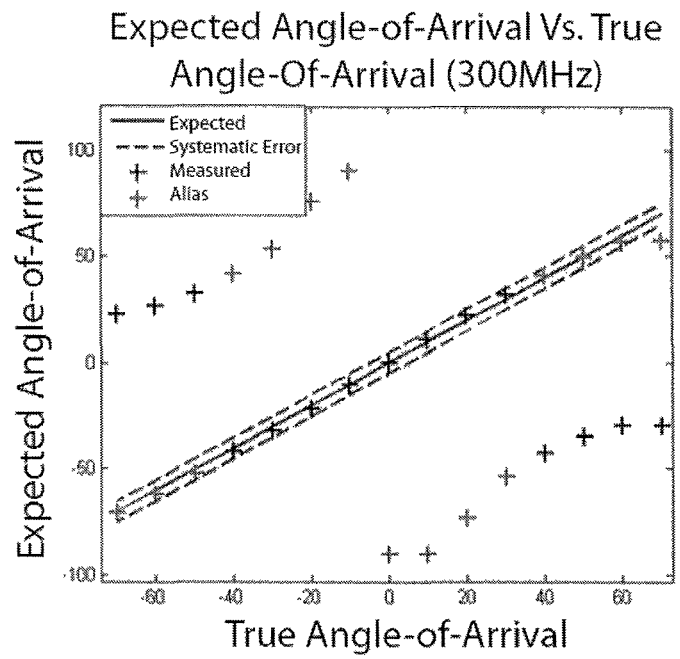
FIG. 6 illustrates calculated angle of arrival.

Since it is generally difficult, due to tolerances, to use the identical hardware for each of the pair of antennas 32, 34 and 36, 38, it has also been found necessary to calibrate system 10 so as to improve agreement between the expected phase differences calculated and the measured phase shifts produced by preliminary geo-location algorithms, as is seen in FIG. 6. The measured angle of arrival agrees well with the true angle of arrival corresponding to the physical configuration of the environment.

In further reference to FIG. 7, four antenna array is arranged in a square formation with the side of the array being set at a predetermined, but adjustable, spacing, for example at ¾λ of the target 2. Λ, being a wave length, is dependent on a frequency of the emission determined by signal processing. This spacing reduces aliasing (the static distortion in the emission signature caused by a low sampling rate) due to phase difference and the simulation shows one solution per antenna pair. Array 1 and 2 are the horizontal and vertical antenna pairs and array 3 and 4 are diagonal pairs. The direction toward the target 2 is identified by the intersection of DoA cones. In this example all cones intersect as arrangement uses a perfect signal without considering any error.

When the spacing of the vertical antenna pair is increased to, for example, 1.5λ, more aliasing is introduced into the system and two possible cones are produced by those arrays which have spacing of greater than one wavelength. This means that the system must distinguish between the correct answer and the alias in order to locate the target. By comparing various arrays, the DoA cones which do not intersect with other solutions can be eliminated.

When the spacing between both the vertical and horizontal antenna pairs is 1.5λ the number of aliases also increases. As shown in FIG. 7, this example, comparing the possible solutions of array 1 and array 2, has no solutions which can be eliminated. However, when comparing array 1 and 4 the alias solution can be identified because they fail to intersect with other cones. FIG. 7 also illustrates the increased accuracy of the system 10 in being able to create four pairs out of different combinations of the four channels.

Aliasing occurs in a wideband array due to the range of wavelengths of various targets. By reducing the antenna spacing these aliases can be reduced. When design requirements hinder close placement of antennas, the synchronization of all four antenna channels aids in eliminating possible aliases and reducing required computing time. When the antenna spacing between the vertical and horizontal antennas is the substantially the same, the complexity of the processing algorithm is reduced, making this approach preferable to reducing the spacing in only one direction. Those aliases which cannot be eliminated at this stage are retained and eliminated during the triangulation calculations.

Due to data inaccuracies caused by signal contamination, platform position error, and other noise, two beams will not intersect perfectly. However, as the number of data points at different platform positions increases, the smaller the volume bounded by the point of closest approach of the beams will become. Instant invention contemplates that some level of measurement uncertainty will be present during processing of the received emissions, and multiple passes or iterations will produce results in which no exact solution may be possible. One advance of the instant invention lies in the minimization methods used to converge on likely answers to the problem. Therefore, it is perfectly suited to yield an accurate result despite the lack of any true closed form analytic solution.

The plots in FIG. 8 demonstrate one example of the results of measurements made at multiple points in the simulated path. Each measurement yields solutions that do not exactly intersect with the target 2, but many of the cone intersections are 'in the neighborhood' of the true position. The geo-location method takes all measurements produced by each measurement, and converges on the best answer given the measured angles of arrival.

Testing of the geo-location DoA extraction algorithms indicated repeatable results with accuracy generally within three (3) degrees. The accuracy of the results is reduced at greater angle of arrival, which is related to antenna performance.

The altitude and azimuth angles of the target 2 with respect to the antenna array were recorded as the target 2 was moved along a circle. The motion of the target 2 was paused at 10 degree increments which are visible in FIG. 9 as multiple measurements with similar azimuth angle. The inaccuracy due to reduced antenna performance at very large angles can be seen. At smaller angles the results show significantly less error. The errors at larger angles are overcome in the instant invention by use of statistical techniques at step 116.

The accuracy of geo-location is also dependent on algorithms capable of accepting or rejecting data from a single measurement at the target 2 based on the quality of the information contained. In the instant invention, a single evaluation of the emissions from the target 2 is defined as the collection of frequency signals from the target 2 in the frequency domain taken at a single position relative to the target 2 of the antenna array carrying vehicle 20. The vehicle 20 is preferably moving during the collection time of this data, but it is assumed that the distance moved during a single evaluation's data collection is small relative to the range to the target 2 and, as such, does not significantly affect the collected data.

It is necessary, in the instant invention, to have means of rejecting data from evaluations that are inconsistent with the statistical majority. This corruption is caused by noise, multi-path, or other flaws in the collected data. Inclusion of such data leads to calculated angles of arrival that vary from the actual direction of the target 2. When included with accurate data from other evaluations, the corrupted data can cause the geo-location solution to degrade in accuracy.

Figure 9:
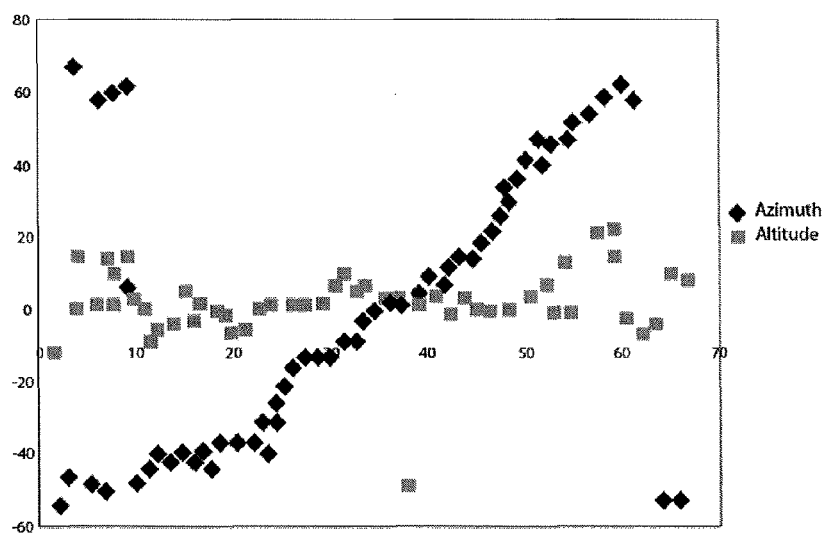
FIG. 9 illustrates Azimuth and Altitude Angles of a Slowly Moving Target.

At the beginning of a geo-location process, the target 2 may be far enough away from the vehicle 20 so that the signal's power, reduced by distance and ground effects, is small compared to the noise from the electronic components of the system 10. In such situation, the complex phase of the total measured signal, target signal plus noise, is dominated by the phase of the noise and the spatial arrival phase will be obscured. As the vehicle 20 travels closer to the target 2, the signal to noise ratio (SNR) grows and the spatial arrival phase of the target emission signal will dominate the complex phase of the total signal. It has been found that the SNR reaches a maximum somewhere near the point of closest approach (assuming no deleterious environmental effects at that point) and then begins to wane as the vehicle 20 departs and increases the range. At some, as the vehicle 20 travels away from the target 2, the SNR will be too low to give a useful signal for spatial phase extraction. Environmental effects can also cause a small SNR. For example an obscuring object might shadow the target 2 in the middle of a geo-location process, degrading the target 2's signal. Or, there may some other environmental noise, e.g. jamming or some other broad-band noise generator. FIG. 9 shows the impact of SNR on the accuracy of results.

An additional technique to reduce the impact of measured deviations from the true angle of arrival is employed to reduce the impact of DoA fluctuations. In this technique, evaluations within a spatial bubble are statistically evaluated, thus reducing the impact of any random noise that could potentially reduce the precision of a single measurement. This benefits the geo-location in two ways. First, the precision of the independent evaluations increases, providing better triangulations between geo-location evaluations 118. Additionally, nearly parallel rays will be combined rather than used individually, reducing wasteful computational overhead within the processing means 42.

It has been found that, during the geo-locating process, target position estimation is needed to reduce the error caused by isolated poor data points. Generally, position estimates based on probing into a defined "measurement bubble" are averaged in an un-weighted fashion to obtain a "bubble estimate" of the target position. The bubble estimates are placed into a histogram, treating each dimension separately. The minimum and maximum sample value in each dimension defines the limits of the corresponding histogram. The overall target position is estimated from the one-dimensional histograms in multiple dimensions as follows: for a given coordinate, the most significant bin is found in the corresponding histogram; the position coordinate is then estimated as the mean of all data points in the maximal bin of the corresponding histogram.

It has been further found that the drawback of the above described method for target position estimation in the instant invention is that such method neglects the correlation between the different coordinates; a true target position should have correlated coordinates across the bubble estimates. Thus, the instant invention addresses this shortcoming by use of statistical techniques 116. In this method, the bubble target position estimates are used to fill a histogram in m dimensions, where m is two or three, depending on the application requirements. The m-dimensional centroid of the maximal bin is used as the overall target position estimate. This m-dimensional histogram method takes advantage of the multi-dimensional correlation between data points, potentially providing a better estimate of the target position.

When the number of entries in the most significant region is small, the non-parametric bootstrap is an appropriate tool for estimating the uncertainty related to the statistical distribution of measurements in each dimension. Either standard error or confidence levels of a given statistic may be estimated using the non-parametric bootstrap. It is called 'non-parametric' because no assumption about the underlying probability density function (PDF) is assumed; the data themselves are used to estimate an empirical PDF. The statistic for which an uncertainty estimate is desired is then estimated from the bootstrap sample. This procedure is repeated B times, creating B estimates of the statistic of interest. In the current application, the statistic of interest is the emission source position. The standard error on the position then becomes the standard deviation of the distribution of bootstrap estimates. Confidence levels are estimated from the distribution of bootstrap values.

The implementation of the m-dimensional histogram method allows for the application of arbitrary weights to each data point, identified by geo-location algorithms 118. The normalization of the weights is done internally. The region with the largest sum of weights is then used for estimation of the target position. The centroid of the most significant region is determined as the weighted mean of its constituent data points. The instant invention contemplates incorporation of the geometrical information relating the different triangulations, forming a portion of geo-location algorithms 118. One consideration is angular resolution: triangulations which use rays with larger separation between ray origins should have a higher weight due to the larger angular difference between the rays' unit vectors. Ideally, the arc length along the trajectory of the vehicle 20 between the two ray origins would form the basis of a triangulation weight. However, a highly correlated quantity is used in the implementation: the difference between logical array indices of the two rays. The latter is much faster to implement than the scheme based upon arc length. This component of the weighting scheme produces qualitative improvement in the stability and accuracy of the geo-location algorithm for an "L"-shaped trajectory of the vehicle 20, illustrated in FIG. 14.

L-shaped pattern is one particularly difficult case. In L-shaped pattern the vehicle crosses the path of rays produced earlier in a geo-location run. In this case, the uncertainty in both the course of a vehicle as well as uncertainty in the measured angle of arrival compound to produce a very difficult analysis environment.

Another component of the weighting scheme may incorporate the distance of closest approach of two rays. Two rays which happen to cross in an arbitrary two-dimensional plane may not actually be related to the same target 2. This component of the weighting scheme would address spurious triangulation solutions which occur due to dramatic changes in the trajectory of the vehicle 20 or poorly measured rays. Due to the three-dimensional nature of this weight component, it is presently preferred when three-dimensional data is available and reliable to make optimal use of geo-location algorithms 118. A pitch sensor is required to process altitude information. It is to be understood that an airborne platform 20 would benefit most from this weight component as compared with a ground-based platform 20.

Figure 10:
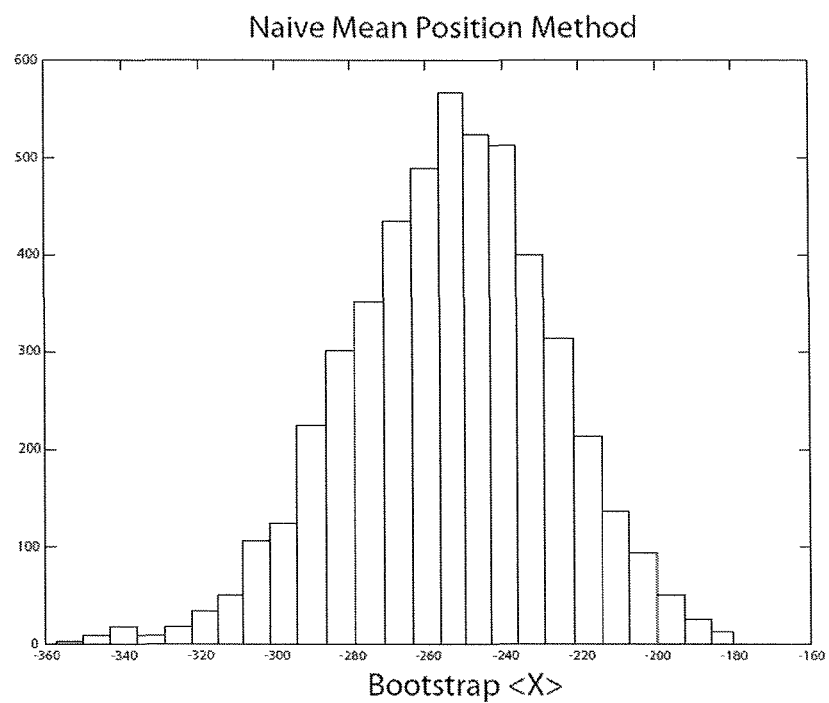
FIG. 10 illustrates Bootstrap mean x distribution with B=5000, obtained using the naive mean position method.
Figure 11:
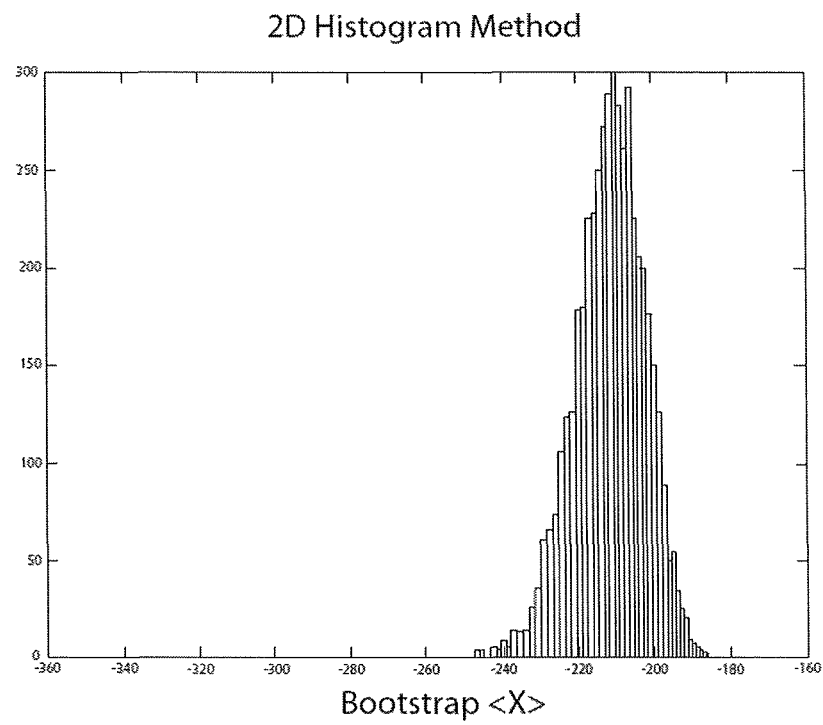
FIG. 11 illustrates Bootstrap mean x distribution with B=5000, obtained using the 2D histogram mean position method.
Figure 12:
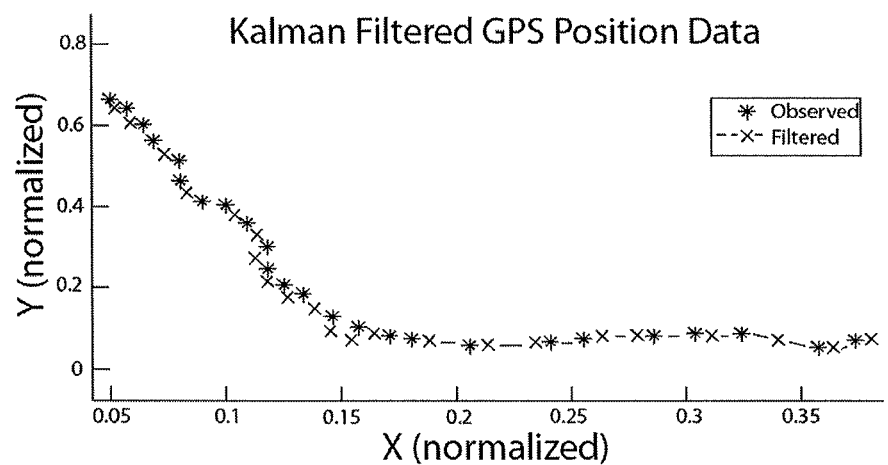
FIG. 12 illustrates Rauch-Tung-Striebel Algorithm for Optimal Trajectory with Kalman filter techniques.
Figure 13:
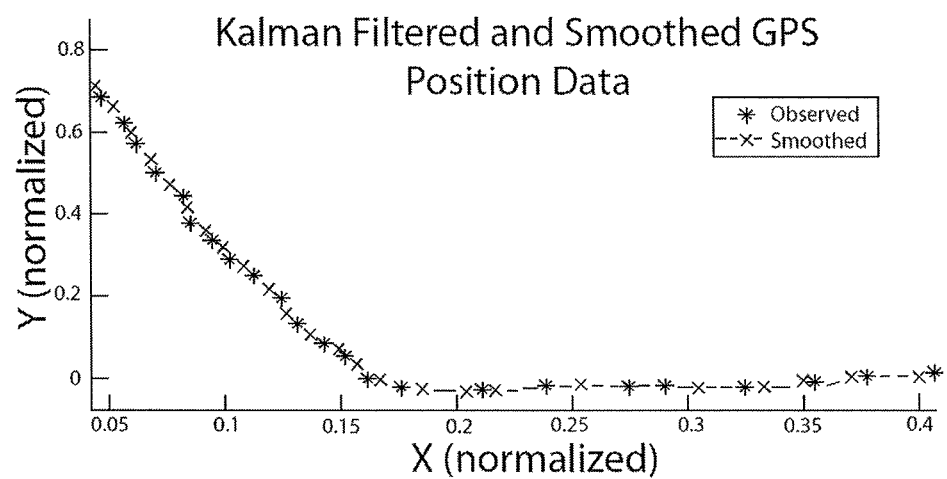
FIG. 13 illustrates Rauch-Tung-Striebel Algorithm for Optimal Trajectory with both Kalman filter and fixed-lag smoothing techniques.
Figure 14:
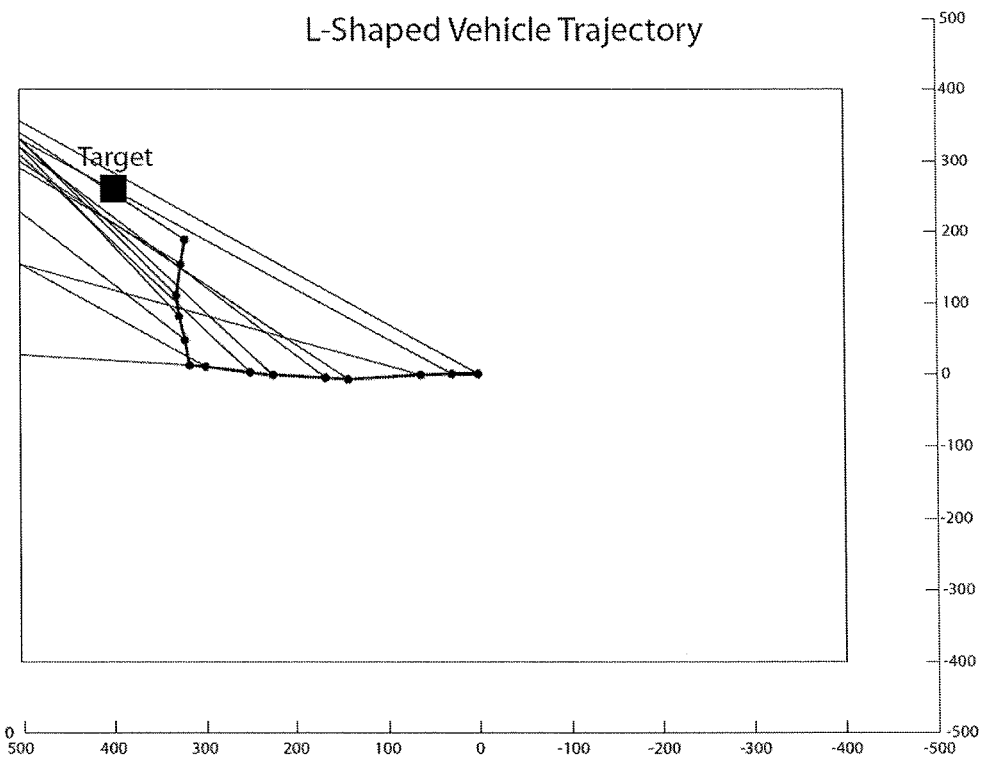
FIG. 14 illustrates Triangulations Performed using Measured Data from an L-shaped Path.
Figure 15:
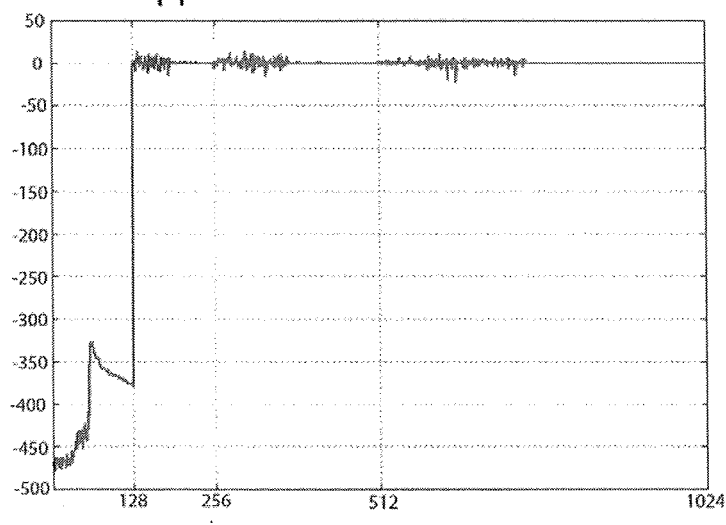
FIG. 15; illustrates 3-level wavelet decomposition with a side-by-side detail and approximation coefficients at all 3 decomposition levels.
Figure 16:
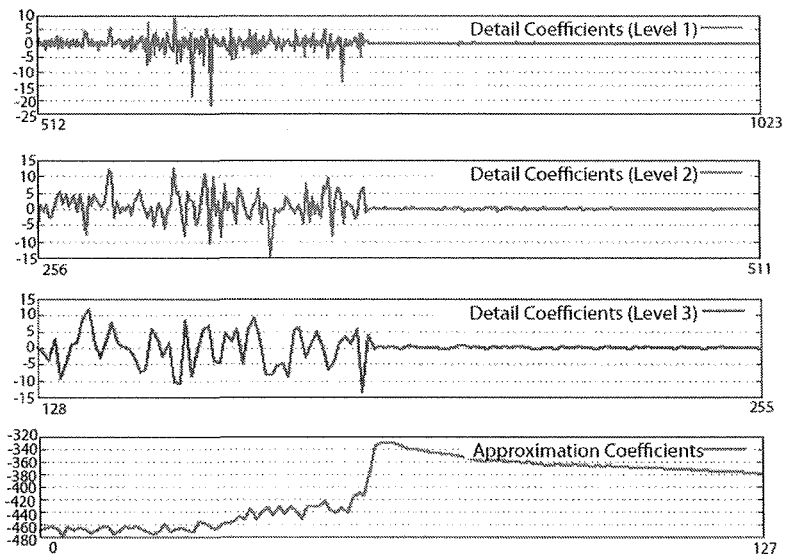
FIG. 16 illustrates the detail and approximation coefficients in top-down decomposition levels, wherein the relationships of the coefficients between levels and the relationships between the detail and the approximation coefficients can be easily viewed and further analyzed.
Figure 18:
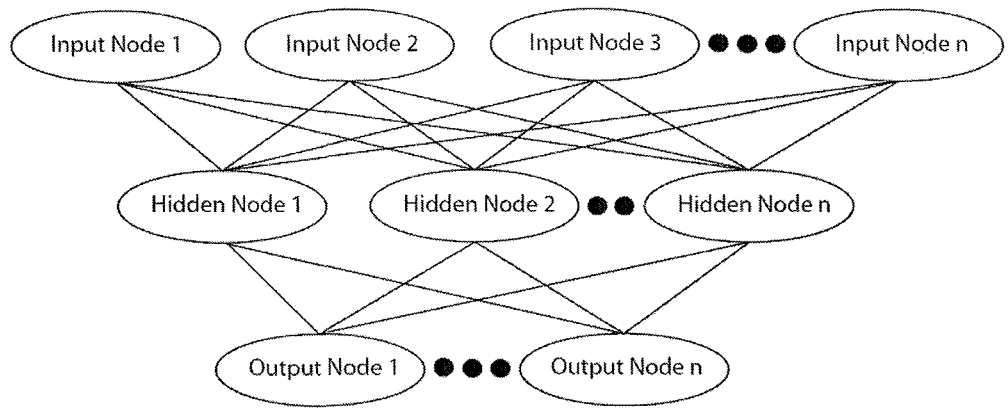
FIG. 18 illustrates the structure of a standard feed-forward neural network.

Another method contemplated by the instant invention is the distribution of numerous bootstrap unweighted values for the naïve mean method is shown in FIG. 10. This method simply calculates the coordinate in each dimension using the entire dataset (i.e. without binning or clustering of bubble estimates). The corresponding distribution for the 2D histogram method is shown in FIG. 11. By way of an example, the following description is based on dataset for a linear vehicle trajectory. Both distributions are unimodal and are fairly symmetric (the skew value is small). Due to the fact that the 2D histogram method uses only the data points in the maximal bin, the distribution of bootstrap mean values is narrower than the naïve mean method. This necessarily results in a smaller measure of uncertainty on the mean values. Similar results hold for the distribution of bootstrap mean y values.

The variability in the bootstrap estimation of the 95% confidence levels was studied as a function of the number of bootstrap samples B. For the dataset in the example, the bootstrap standard error estimates are approximately 1.2% in x and 1.1% in y. The lower and upper 95% confidence limits were estimated as (−2.7, +2.1) % in x, and (−1.8, +2.5) % in y. It has been also found that accuracy of target position estimation and, more particularly, the accuracy of the direction of arrival, benefits from accuracy of the relative original position of the system 10 and subsequent filtering of such relative position.

Direction to target measurements are calculated and referenced to the orientation of the antenna array. The antenna array follows the trajectory of the platform 20 and it is therefore preferred, in a full system implementation, to accurately measure and estimate the true trajectory of the platform 20 with high precision. While GPS data from means 44 provides an estimate of position and trajectory, the variance of these estimates has been found too large to provide needed resolution and, subsequently, accuracy in locating the target 2.

Accordingly, the instant invention contemplates filtering of the relative position of the platform 20. The instant invention takes advantage of what is conventionally known as a Kalman filter, developed for application to the Apollo Program, which is a recursive estimator providing an optimal estimate of linear systems which contain data within random noise. The Kalman filter assumes the true state at time k is evolved from the state at (k−1). Both the state and error estimates are updated at each iteration through the following equations:

Predict

Predicted (a priori) state $$X_k = F_k X_{k-1}$$

Predicted (a priori) estimate convariance $$P_k = F_k P_{k-1} F_k^T + Q_k$$

Update

Innovation or measurement residual $$Y_k = Z_k - H_k X_k$$

Innovation (or residual) covariance $$S_k = H_k P_k H_k^T + R_k$$

Optimal Kalman gain $$K_k = P_k H_k^T S_k^{-1}$$

Updated (a posteriori) state estimate $$X_k = X_k + K_k Y_k$$

Updated (a posteriori) estimate covariance $$P_k = (I - K_k H_k) P_k$$

The Kalman filter requires the covariance of the observation noise and covariance of the process noise variables to define the process. The specific values of these variables $R_k$ and $Q_k$ may be optimized through an analysis of trial data sets or through error minimization algorithms developed in academia.

It has been further found that to improve accuracy of geo-locating position of the target 2, the output results obtained by the use of Kalman filter should be improved through use of a fixed-lag smoother, for example such as the Rauch-Tung-Striebel Algorithm. This algorithm applies the Kalman Filter in the forward direction to form the position and covariance estimates and then performs a backward pass on the data according to:

Position Estimate $$X_k = F_k X_{k+1} + K_k X_{k+1}$$

$F_k$ $$F_k = F_k^{-1}(I - Q_k P_{k+1}^{-1})$$

$K_k$ $$K_k = F_k^{-1} Q_k P_{k+1}^{-1}$$

The output of this backward pass on the data provides an optimal estimate of the true position of the platform 20 through a recursive minimization of the covariance.

It must be noted that the m-dimensional histogram/bootstrap/weighting method and the Kalman filtered course adjustments in step 114 have been found as significant contributors to improving accuracy of the geo-location system 10 as a whole.

The presently preferred geo-location system 10 is designed to operate with a four antenna element array made up of two orthogonal antenna element pairs. Thus, the motion of the platform 20 is either perpendicular to both pairs or is in the direction of one of the pairs. This corresponds to an array that faces forward on a ground based system or a downward facing array on an airborne platform. It is presently required that the platform 20, onto which the geo-location system 10 is mounted, has available spacing for an orthogonal array. In some cases this may not be true. Thus, the instant invention anticipates any angle, not just 90 degrees, between the two antenna element pairs.

In order to achieve a similar accuracy when geo-locating multiple targets 2, the Wavelet Direct algorithm is being applied to provide target discrimination. After Analog to Digital Converter sample processing on the received signal at a given antenna, the discrete representation of the signal is broken up into several terms. The latter terms only occur in a signal with noise. Wavelet Direct algorithm can be used to minimize these terms and reduce the noise in the signal. The geo-location module extracts phase information from Fourier IQ data through the FFT process. In the instant invention, the skewness-approach Wavelet Direct is intended to function in the power spectrum domain.

There are two challenging scenarios for detection. First, it is challenging to detect the target of interest in low signal-to-noise ratio (SNR) environment. Second, even in high SNR environment, it is also challenging to detect the target of interest with time-varying signatures. The first scenario includes the noisy detection environment, long-range detection, etc. Our initial demonstration and evaluation show that wavelet transform technique is capable to identify the signal signature from noisy or low SNR environment. Wavelet Direct technique is designed to utilize the multi-resolution property of wavelet transformation, which decomposes the input signal into multiple resolution levels, to perform signature categorization on decomposed signal (i.e., approximation and detail coefficients) in wavelet domain to identify the target. The wavelet decomposition is performed using a novel 'lifting scheme' (wavelet decomposition and reconstruction scheme) to produce approximation and detail coefficients at each resolution level.

In Data Processing engine, Discrete Wavelet Transform (DWT) is used in signal de-noising, with other data processing functions, for detection pre-processing. In the detection engine, DWT is employed to form a working domain (wavelet domain) to perform the detection.

Wavelet Direct is different from Wavelet Denoising. Wavelet Denoising removes zero-mean noise, and preserves the profile of signal of interest by keeping approximation coefficients at pre-defined decomposition level. Wavelet Direct utilizes the detail coefficients beyond the pre-defined coarsest level to capture the usefully detectable features of signal of interest.

Two statistical methods are employed in Wavelet Direct module. The first method is called 'Forward-Backward Cumulative Wavelet Variance' and the second method is called 'Forward-Backward Cumulative Wavelet Distance'. Both methods characterize the unique features obtained from the detail coefficients in wavelet domain. Those two methods have been applied together to detect the electronic target with time-varying signatures such as Emission Source device.

The Cumulative Wavelet Distance (CWD) is a measure by calculating the average distance among the adjacent detail coefficients at the same decomposition level.

The steps to execute Wavelet Direct are shown as follows:

1. Decompose the data-processed power spectrum to the one decomposition level coarser than Wavelet Denoising level. For example, if the wavelet denoising level used in Wavelet Denoising module is set to 2, then the coarsest level for CWVs/CWDs is set to 3.

2. Choose a proper value of $N_c$ and then calculate the forward and backward CWVs/CWDs from the detail coefficients at the coarsest decomposition level.

3. Calculate the difference between the forward and backward CWVs, as well as the difference between the forward and backward CWDs at each incremental n from n=0 to n=$N_c$-1.

4. At each incremental n, use the maximal difference value from CWV-difference and CWD-difference as the final difference value at n.

Figure 17:
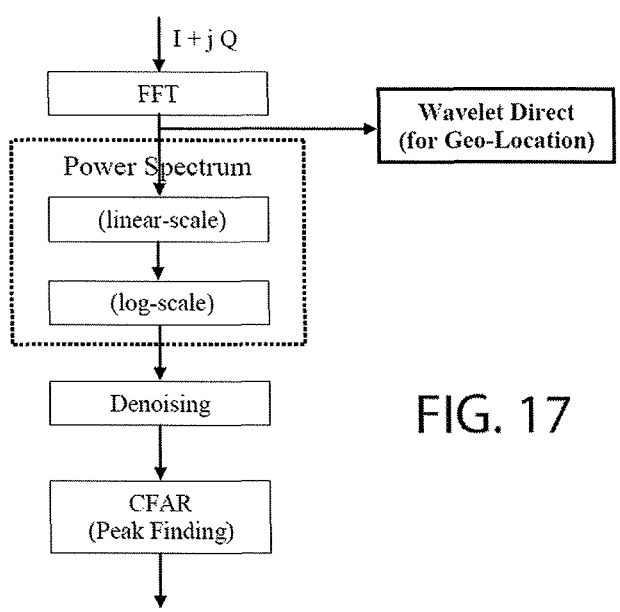
FIG. 17 is a block diagram of Wavelet Direct technique application.

As shown in FIG. 17, the geo-location algorithm can extract phases from Fourier I-Q data. Skewness-approach Wavelet Direct is used to apply on power spectrum domain.

The instant invention is also configured to perform cluster analysis on phase data extracted from plurality of emission signature samples. It further includes the step of correlating results of the cluster analysis to at least one of path, trajectory and velocity of the moving platform 20. The instant invention also takes advantage of the Neural Networks that have the ability to recognize patterns from one or more processes given a set of useful input quantities. These input quantities can then be combined in a non-linear fashion to yield an output which states how 'signal-like' or 'background-like' a particular set of inputs appears to be given a priori knowledge of the type of input patterns to expect. A standard feed-forward back propagation neural network is trained given a set of input variables to discern a frequency domain target signature from background noise. The variables used to separate signal and background data are calculated from the power spectrum in the frequency domain after standard filters and are applied to the digital signal. Some variables are maximum power relative to noise floor, number of frequencies surrounding peak frequency above noise floor, and integrated relative power of frequencies surrounding peak frequency above the noise floor.

The neural network is unbiased towards any particular set of frequencies in the span (omitting data in which the peak frequency is near the edge of the span).

The neural network not only takes advantage of the differences in the distribution of values between signal and background for each variable individually, but also the correlations between each neural network input. This provides the potential for improving the rejection of background while increasing the efficiency of signal identification over a simple linear combination of variables. The neural network can accommodate several input nodes, a hidden layer and an output layer with one or more nodes. The signal was trained to a target output of +1 (background to 0) using a large statistical representation of both signal and background for training. The varying locations of data taken for the signal are used to produce a network capable of identifying a signal with a large range of signal strengths, particularly in cases where the signal is very weak.

Artificial Neural Networks (ANNs) are tools which, when appropriately implemented, can be extremely powerful in effectively combining large sets of complicated information. Given a set of values from algorithms quantifying waveform operation and a target value which indicates the 'type' of data, an ANN can be trained to classify an arbitrary dataset. In fact, as the ANN output is a product of a series of smooth response functions, the classification output can be translated into a confidence level which indicates how consistent a measured dataset is with a particular class of phenomena. The ANN is optimized through the use of an error function $$\left(e = \frac{1}{N}\sum_i (T_i - O_i)^2\right),$$

which is typically updated through training iterations (epochs), which utilize a minimization process such as gradient descent.

This method of learning patterns and trends in large datasets has advantages over more traditional methods of combining results, since the nonlinear combination of inputs takes advantage of correlations and can identify multiple statistically significant trends in the training data. This yields a highly versatile network which can identify a range of phenomena accurately, assuming the network has been trained intelligently.

While ANNs can be extremely powerful tools which have the ability to greatly outperform standard classification algorithms, the performance is directly related to the training parameters and training datasets provided. Consequently, ANNs will perform only as well as they are trained to. The difficulty rests in preparing training datasets which produce a comprehensive statistical representation of the full span of phase space that the network will cover. This means that a large amount of measured or simulated data (assuming the simulation is truly representative of real data) in all expected scenarios must be collected to ensure that any data measured by the system will be categorized appropriately.

The neural network output consists of the data used in the training process. The output of the all data points from signal and noise fill a histogram, which is subsequently normalized. The resulting distributions approximate the probability of a given outcome for similar sets of data. While the signal data does not peak as strongly as noise does near its target value, a large portion of the training data utilized contains very weak signals. To study the true effectiveness of the detection capabilities, orthogonal sets of signal samples are processed with the network to determine the capabilities with stationary, unbiased data.

Test indicated the ability of the network to separate and identify data containing a signal, which unsurprisingly better classifies signals which are closer and less shielded from the antenna.

The quantities utilized for separation of signal from noise are focusing on the strength of the signal peak and the width of the signal. The significance of deviation from a smooth falling power spectrum with respect to the peak value provides another significant input or set of inputs which will improve the identification of a signal from difficult sources of background such as Electro Magnetic Interference (EMI).

Additionally, analysis of the signatures produced by time-variant devices was undertaken to extract useful features which can be exploited by a neural network for the purpose of confident detection. A difficult aspect of cyclical devices is related to the uncertainty with each individual look, as the specific piece of the frequency cycle which is being integrated over is undetermined. Therefore, to ensure that each individual look is capable of fingerprinting a specific time-variant device, a database of profiles must be produced for all potential slices in time.

This can be difficult, as the computational overhead related to searching for a viable match amongst multiple possibilities pulls resources away from other important tasks, such as searching for other targets. However, the advantage of an artificial neural network is in its ability to break down problems into a simple form, producing a single solution to a complex problem.

Relative to devices with invariant frequency content, the process of preparing a time-variant device's dataset for training purposes is challenging. Data taken without care will consist of many snapshots containing information which is of no use, as some integrated cycles have little or no frequency content that can be leveraged. These cases are virtually identical to noise, and introduce serious problems in the training as the resulting network will attempt to classify noise-like data as the device of interest. Therefore, some amount of filtering is necessary before the training process begins to toss out noise-like data. The resulting dataset contains measurements which are characteristic of useful real-time data, providing the ability to produce a versatile and robust network.

The last major advantage of a neural network is in ability to classify multiple targets simultaneously. Targets which produce content in similar frequency ranges need not only be identified as "not noise", but also must be singled out as unique when compared to the other devices which produce information in the range of interest. One potential solution is to build several expert networks which classify all permutations of relevant devices, producing multiple outputs which can proceed to be combined into a unique solution for each individual target. This strategy is computationally intensive, and potentially introduces unwanted complexity. The solution used in the instant invention involves a single neural network with multiple output nodes. The multiple dimensions in the output space allow for a unique specification of an arbitrary number of targets when enough output nodes are provided. The particular case explored involves two targets which produce frequency content in a similar range. These are trained such that they are not only discernable from noise, but also from one another.

The training process attempts to push each dataset towards its target position in output space. Each specific measurement populates a bin in the 2-dimensional output space of the neural network, resulting in likelihood that a snapshot of a particular type of data will produce a certain pair of output values. The network created by the training process efficiently classifies the two devices of interest.

The instant invention provides a substantially synchronized chain of emission signal processing simultaneously at all antennas. Clock and signals are processed essentially at the same time and in the same manner.

Extraction of specific spectral features from collected measurements of electromagnetic emissions using wavelets to brake information into multiple levels and further braking spectrum into specific levels and extracting phase information are novel advantages of the instant invention allowing geo-location of weak signals, such as those at −160 dBm and below, and geo-location of devices with limited data sets.

It is further contemplated that the apparatus 30 shown in FIG. 1 could be integrated onto a single integrated circuit (IC) for the detection and geo-location of electronics, degradation of electronics and anomalies in the signatures given off by electronics. In another embodiment, all items shown in FIG. 1, except the vehicle 20, could be integrated into a single IC for use as a stand-alone electronics geo-location. Furthermore, this invention is contemplated to perform standoff detection and geo-location of electronic devices and further detect any anomalies with the electronic devices detected at range to include counterfeits, tampering, degraded devices or devices that have been substituted where other items are anticipated.

Another aspect of the instant invention is application of the above described embodiments to geo-location (direction and/or real world spatial coordinates) of target 2 being a Cognitive Radio transceiver, which seeks to provide a solution to the growing problem of RF spectrum scarcity. As part geo-location process, the invention also contemplates detection and identification of the target prior to geo-location. As part of this process, the frequency and amplitude characteristics of the target will be precisely known. This information is very important for de-confliction requirements related to cognitive radio.

Ad-hoc networks which use currently available spectrum can be setup on-the-fly, and multiple nodes can potentially join the network. With respect to a network hub compiling information provided by distributed cognitive radios, the capability to compare transmitted information such as node identity and GPS coordinates to the measured direction of the physical RF waves received by the hub can drastically increase confidence in the reliability of the data. The true direction of an incoming RF signal can be directly measured using two or more antenna elements configured in a known pattern. High-throughput software defined applications can extract phase information from each antenna element and proceed to compare the phase differences observed by each. The Direction of Arrival (DoA) is directly calculated from the phase differences measured by the array. Comparing the measured direction to the coordinates of a cognitive node can verify the reliability of information from the node.

Accordingly, the system 10 is adapted to collect and process transmissions from Cognitive Radio transceiver. The system 10 is configured to define direction to Cognitive Radio transceiver when platform 20 is stationary and further define spatial coordinates of the Cognitive Radio transceiver during movement of the platform 20.

As it has been described above, the instant invention also provides for a network of systems 10 for identifying a real-world geographic location of at least one and, preferably plurality of emission sources, each emitting electromagnetic energy. Such network includes at least a pair of platforms 20, 20' disposed in a spaced apart relationship with each other and configured for movement independently from each other. The apparatus 30 is on each platform 20, 20' and is configured to at least collect, in a passive manner and during movement of said platform, at least one sample of the electromagnetic energy emission. Furthermore, at least one of the at least pair of apparatuses 30 is configured to define angular and spatial coordinates of the emission source 2 or, alternatively, processing of the collected emission signals can be done at a remote location (not shown).

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

We claim:

1. A system for determining a real-world geographic location of an emission source emitting an electromagnetic energy signal, said system comprising:
    (a) a platform configured for movement; and
    (b) an apparatus disposed on said platform and configured to collect and process, in a passive manner and during movement of said platform, at least two pairs of successive samples of a weak electromagnetic energy signal emitted from the emission source and define, by extracting phase information from Fourier IQ data in said at least two pairs of successive samples of said weak electromagnetic energy signal through Fast Fourier Transform (FFT), angular and spatial coordinates of the emission source, one sample of said weak electromagnetic energy signal in each pair from said at least two pairs being processed, to extract said phase information, independently from but substantially simultaneously with another sample of said weak electromagnetic energy signal in said each pair from said at least two pairs.

2. The system of claim 1, wherein said apparatus includes:
(a) a first antenna mounted on or within said platform and configured to collect at least a pair of first samples from said at least two pairs of successive samples of said weak electromagnetic energy signal;
(b) a second antenna positioned in a spaced apart relationship with said first antenna, said second antenna configured to collect at least a pair of second samples from said at least two pairs of successive samples of said weak electromagnetic energy signal;
(c) a receiver mounted on or within said platform and operatively coupled to each of said first and second antennas; and
(d) a processor operatively coupled to said receiver, said processor operable to process, during said movement of said platform, said at least two pair of said successive samples of said weak electromagnetic energy signal.

3. The system of claim 1, wherein said weak electromagnetic energy signal is at or below −160 dBm.

4. A system for determining a real-world geographic location of a source emitting an electromagnetic energy signal, said system comprising:
(a) a platform configured for movement;
(b) means for determining position of said platform at least prior to movement thereof;
(c) at least a pair of antennas positioned in a spaced apart relationship with each other, each of said at least pair of antennas configured to collect electromagnetic energy emitted by the source, wherein at least one of said at least pair of antennas is mounted on or within said platform;
(d) a receiver mounted on or within said platform and operatively coupled to said each of said at least pair of antennas; and
(e) a processor operatively coupled to said receiver, said processor configured to process, during movement of said platform, in a parallel manner at least a pair of successive samples of a weak electromagnetic energy signal emitted from the emission source and collected independently at each of said at least pair of antennas and define, by extracting phase information, from Fourier IQ data in said electromagnetic energy signal through Fast Fourier Transform (FFT), angular and spatial coordinates of the emission source, one of said at least pair of successive samples of said weak electromagnetic energy signal being processed, to extract said phase information, independently from but substantially simultaneously with another one of said at least pair of successive samples of said weak electromagnetic energy signal.

5. The system, according to claim 4, wherein the emission source is a stationary emission source.

6. The system, according to claim 4, wherein the emission source is a plurality of stationary emission sources.

7. The system, according to claim 4, wherein said electromagnetic emission is one of intentional or unintentional.

8. The system, according to claim 4, wherein said platform is a vehicle having motive power or being connected to a vehicle having motive power.

9. The system, according to claim 4, wherein said each of said pair of antennas is an antenna array.

10. The system, according to claim 9, wherein said antenna array is a beam-steer antenna array.

11. The system, according to claim 4, wherein said each of said at least pair of antennas is mounted on said platform.

12. The system, according to claim 4, wherein said angular and spatial coordinates define a distance from said platform to the emission source.

13. The system, according to claim 4, wherein said angular and spatial coordinates define one of an altitude of the emission source and an approach or a departure of said platform relative to the emission source.

14. A method of geo-locating an emission source emitting an electromagnetic energy signal, said method comprising the steps of:
(a) providing an apparatus including a platform configured for movement, at least a pair of antennas positioned in a spaced apart relationship with each other, each of said at least pair of antennas configured to collect the electromagnetic energy emission, wherein at least one of said at least pair of antennas is mounted on or within said platform, a receiver mounted on or within said platform and operatively coupled to said each of said at least pair of antennas, and a processor operatively coupled to said receiver;
(b) moving said apparatus toward to or away from said emission source;
(c) collecting, with each of said at least pair of antennas, at least a pair of successive samples of a weak electromagnetic energy signal emitted by said emission source;
(d) receiving, at said receiver, said at least pair of successive samples;
(e) processing, with said processor, one of said at least pair of successive samples of said weak electromagnetic energy signal, in a parallel manner, independently from but substantially simultaneously with another one of said at least pair of successive samples of said weak electromagnetic energy;
(f) extracting with said processor, in said parallel manner from Fourier IQ data through Fast Fourier Transform (FFT), phase information from said one and said another one of said at least pair of successive samples of said electromagnetic energy signal; and
(g) defining, with said processor, angular and spatial coordinates of said emission source.

15. The method, according to claim 14, wherein said step (e) includes the step of independently decomposing wavelets from said one and said another one of said at least pair of successive samples of said weak electromagnetic energy signal.

16. The method, according to claim 14, further including the step of combining phase information extracted in step (f) and the step of determining phase differences between said one and said another one of said at least pair of successive samples of said weak electromagnetic energy signal collected independently at said each of said at least pair of antennas.

17. The method of claim of claim 16, further including the step of determining a travel direction of said platform.

18. The method of claim 14, further including the step of determining at least one of a position and an orientation of said platform at least prior to movement thereof.

19. The method of claim 18, wherein step (e) includes the step of filtering said at least one of position and orientation.

20. The method, according to claim 14, wherein said step (g) includes the step of performing cluster analysis on phase information extracted from said one and said another one of said at least pair of successive samples of said weak electromagnetic energy signal.

21. The method, according to claim 20, wherein said method includes the step of of correlating results of said cluster analysis to at least one of path, trajectory and velocity of said moving platform.

22. The method of claim 14, wherein said step (g) includes the step of performing wavelet denoising.

23. The method of claim 14, wherein said step (g) includes the step of performing a triangulation analysis.

24. The method of claim 14, wherein said step (g) includes the step of employing Neural Networks.

25. The method of claim 14, wherein said step (g) includes the step of filtering a relative position of said platform.

26. The method of claim 25, wherein said step of filtering includes the step of applying a Kalman filter.

27. The method of claim 14, wherein said step (g) includes the step of reducing uncertainty on mean measurement values.

28. The method of claim 27, wherein said step of reducing uncertainty on mean measurement values includes the step of performing a bootstrap statistical analysis.

29. The method of claim 14, wherein said step (g) comprises the step of performing wavelet direct to capture detectable features in said electromagnetic energy signal.

30. The method of claim 29, wherein said wavelet direct comprising a 'Forward-Backward Cumulative Wavelet Variance method and a 'Forward-Backward Cumulative Wavelet Distance method to characterize features obtained from detail coefficients in a wavelet domain.

31. A system for de-conflicting a Cognitive Radio transceiver transmitting an electromagnetic energy signal, said system comprising:
(a) a platform;
(b) a means for determining a position of said platform;
(c) at least a pair of antennas positioned in a spaced apart relationship with each other, each pair of said at least pair of antennas configured to collect pairs of consecutive samples of the electromagnetic energy signal emitted by the source, wherein at least one of said at least pair of antennas is mounted on or within said platform;
(d) a receiver mounted on or within said platform and operatively coupled to said each of said at least pair of antennas; and
(e) a processor operatively coupled to said receiver, said processor configured to process two samples in each pair of samples of the electromagnetic energy signal independently from but substantially simultaneously with one another to extract phase information through Fourier IQ data in said electromagnetic energy signal, with Fast Fourier Transform (FFT), to define, when said platform is stationary, a direction of the Cognitive Radio transceiver, and to compare said direction to coordinates of said Cognitive Radio transceiver.

32. The system of claim 31, wherein said platform is configured for movement, wherein said means for determining position of said platform is configured to determine position of said platform at least prior to movement thereof, wherein said processor configured to process said at least pair of successive samples of the electromagnetic energy signal during movement of said platform and wherein said predetermined logic is further configured to define spatial coordinates of the Cognitive Radio transceiver.

33. An apparatus for determining a real-world geographic location of an emission source emitting an electromagnetic energy signal, said apparatus comprising at least a receiver and a processor coupled to said receiver, said apparatus being configured to collect and process, in a passive manner, at least two pairs of successive samples of a weak electromagnetic energy signal emitted from the emission source and define, by extracting phase information from Fourier IQ data in said at least two pairs of successive samples of said weak electromagnetic energy signal through Fast Fourier Transform (FFT), angular and spatial coordinates of the emission source, one sample of said weak electromagnetic energy signal in each pair from said at least two pairs being processed, to extract said phase information, independently from but substantially simultaneously with another sample of said weak electromagnetic energy signal in said each pair from said at least two pairs.

34. The apparatus of claim 33, further comprising:
a first antenna configured to collect at least a pair of first samples from said at least two pairs of successive samples of said weak electromagnetic energy signal;
a second antenna configured to collect at least a pair of second samples from said at least two pairs of successive samples of said weak electromagnetic energy signal; and
said receiver being operatively coupled to each of said first and second antennas.

35. The apparatus of claim 33, further comprising a platform, said apparatus being mounted on said platform.

36. The apparatus of claim 33, said apparatus being integrated onto a single integrated circuit (IC).

* * * * *